No. 859,461. PATENTED JULY 9, 1907.
R. H. OLD & W. J. LEDERLE.
VAULT LIGHT.
APPLICATION FILED MAY 4, 1907.
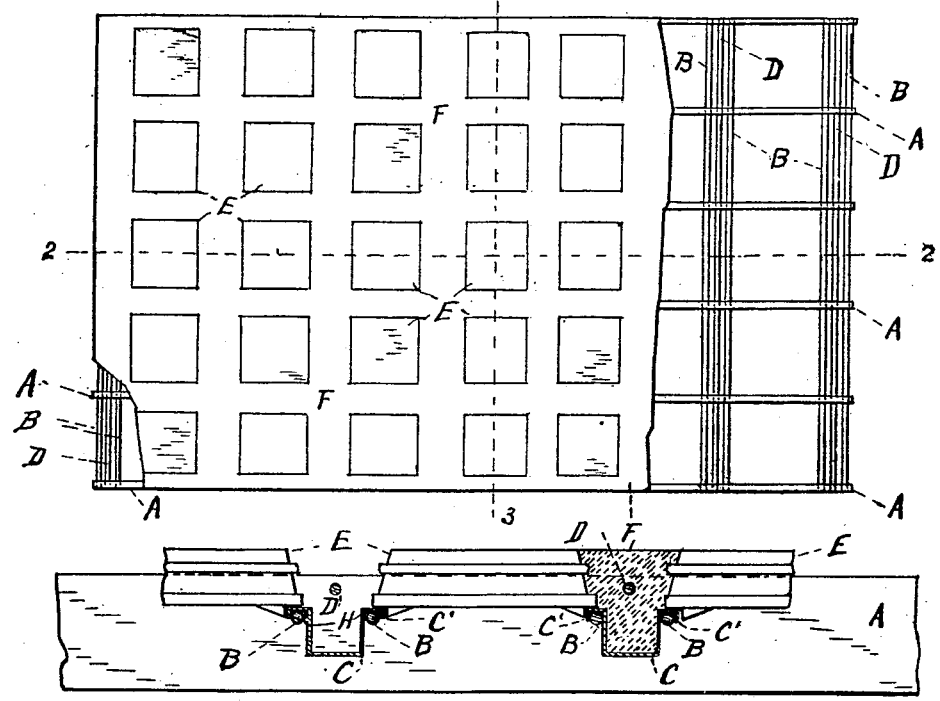
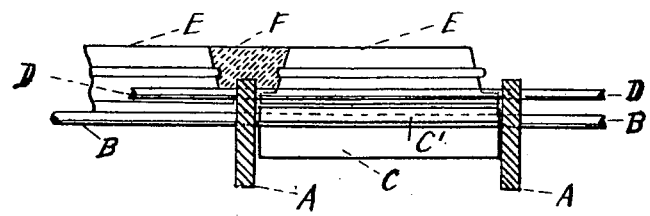
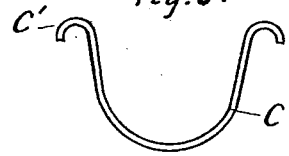
Fig. 5.
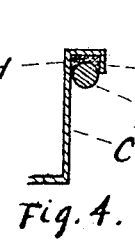
Fig. 4.
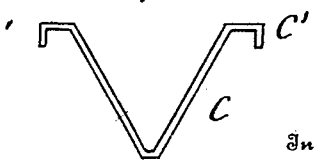
Fig. 6.
Witnesses
C. M. Catlin.
John E. Burch.
Inventors
R. H. Old & W. J. Lederle.
By Benj. R. Catlin
Attorney

UNITED STATES PATENT OFFICE.

ROBERT H. OLD AND WILLIAM J. LEDERLE, OF PHILADELPHIA, PENNSYLVANIA.

VAULT-LIGHT.

No. 859,461.   Specification of Letters Patent.   Patented July 9, 1907.

Application filed May 4, 1907. Serial No. 371,852.

*To all whom it may concern:*

Be it known that we, ROBERT H. OLD and WILLIAM J. LEDERLE, residents of Philadelphia, in the county of Philadelphia and State of Pennsylvania, have invented certain new and useful Improvements in Vault-Lights; and we do hereby declare the following to be a full, clear, and exact description of the invention, such as will enable others skilled in the art to which it pertains to make and use the same.
The invention relates to vault lights, and has for its object to simplify and cheapen the construction, and increase its durability.

The invention consists in the construction hereinafter described and particularly pointed out.
In the accompanying drawing which illustrates the improvement and forms a part of this specification, Figure 1 is a plan showing the general arrangement of the supporting frame, and partly in section to show tiles set in cement; Fig. 2 is a longitudinal section on line 2, 2 of Fig. 1; Fig. 3 is a cross section on line 3, 3 of Fig. 1; Fig. 4 shows a detail enlarged. Figs. 5 and 6 are end views, also enlarged, showing pockets of different cross sections.

A denotes flat steel bars, and B rods passing through and connecting them to form a frame. The bars A may be termed the carrying or main bars, as the entire load is supported on them. The rods B which may be styled glass or cement-supporting rods or tie rods, are spaced at distances apart to suit the size and shape of the glass tiles. Between and below the rods B pockets C, made either of sheet or cast metal, are provided. These may be made of either rectangular, curved or V-shape in cross section, and supported on said rods by overhanging flanges C' as shown in Fig. 2. They admit a putty filling H, before being placed in position. This putty or the like acts as a cushion for the glasses E which rest upon the flanges C' after the pockets are placed upon the rods. Portland cement and sand, F, of formula, such as known to the trade for this purpose, or its equivalent, is introduced between the glassse and into the pockets and the plastic material then smoothed in the usual manner.

When the vault light tiles or panels are made up complete at the factory ready for shipment, we make use of a rod or rods D. Each of these passes through the carrying bars A in the same direction as the rods B, but on a higher plane and they are introduced just before the filling is put in so as to be incased thereby. The object of rod D is to stiffen the panel and prevent displacement of the glasses and filling, in case the panels are turned upside down in handling or shipping, or meet with any rough usage. Each glass E may be of any desired shape or size, but preferably has a projection around its sides or edges of such form as to engage in the cement filling whereby they may be supported independently of the bearing on the pockets and rods.

Standard stock material can be employed to make the frame, and sheet metal pockets can be easily formed by an ordinary tinner's folder or brake, the construction in its entirety being simple and comparatively inexpensive.

The pockets we believe to be a new feature in vault-light construction. They provide for a considerable depth of cement or concrete filling between the glasses, which is of special importance for the reason that a small shallow body or layer of cement does not have much bond or strength and readily breaks up or crumbles. Since also the pockets of cement extend below the bars B and between the carrying bars A it forms a brace similar in effect to bridging between joist or beams in carpentry and prevents racking.

Vault lights are subjected in traffic to much pressure from shifting loads and the prevention of a racking movement of the parts of the panel is important, and this is effected by our improvement.

The rod D employed to hold and strengthen the band of concrete between the glasses is also new in bar construction for vault lights.

Obviously the improvement is not limited to rods or bars of a round form in cross section.

We are aware that the simple arrangement of wrought iron bars and rods is not new in itself, and we only claim it in combination as hereinafter pointed out.

What we claim is,—

1. In a vault light, the combination of a plurality of rows of glasses, a frame comprising carrying bars, a pair of transverse rods passing through the said bars between each pair of such rows, a pocket supported on said rods, and cement filling the pocket and space between the glasses.

2. In a vault light, the combination of a frame comprising a series of carrying bars, rows of glasses, coacting transverse rods adjacent the proximate edges of the rows, a plurality of alined pockets supported on said rods, said pockets situated between and abutting against corresponding bars, and cement filling the pockets and spaces between the glass rows.

3. In a vault light, the combination of a frame comprising the carrying bars, transverse rods, a pocket supported on said rods, glasses, and cement filling the pocket and space between the glasses, said pocket having flanges to embrace the rods, and a plastic filling between the flanges and rods.

4. In a vault light, the combination of a frame comprising a series of carrying bars, rows of glasses, coacting transverse rods adjacent the proximate edges of the rows, a plurality of alined pockets supported on said rods, said pockets situated between and abutting against the corresponding bars, cement filling the pockets and spaces between the glass rows, and a cement-retaining rod situated in the cement above the pockets and connecting the carrying bars.

5. In a vault light, the combination of the main bars, the transverse rods, the pockets having flanges resting on said rods, the glasses resting on the pocket flanges, and the cement filling the pockets and the spaces between the glasses and supported in part on said flanges.

6. In a vault light, the combination of the frame comprising glass-supporting rods, the glasses, pockets or receptacles suspended below the glasses, and a body of cement continuous between the glasses and from their upper level to a plane below the rods, and a plastic cushion between the glasses and rods.

In testimony whereof, we have signed this specification in the presence of two subscribing witnesses.

ROBERT H. OLD.
WILLIAM J. LEDERLE.

Witnesses:
 JOS. W. MILLS,
 ARTHUR H. BURTON.